United States Patent [19]

Takada et al.

[11] 4,040,920
[45] Aug. 9, 1977

[54] METHOD OF PREVENTING POLLUTION OF SLUDGE FORMED BY ELECTROLYTIC ETCHING WORK

[75] Inventors: Koji Takada; Takashi Misu, both of Nagoya, Japan

[73] Assignee: Mitsubishi Denki Kabushiki Kaisha, Tokyo, Japan

[21] Appl. No.: 682,119

[22] Filed: Apr. 30, 1976

[30] Foreign Application Priority Data

May 21, 1975  Japan ................................ 50-59669

[51] Int. Cl.² .......................... C25F 3/02; C25F 7/00; C25F 7/02
[52] U.S. Cl. ............................. 204/129.75; 204/238
[58] Field of Search ............... 204/129.1, 129.75, 232, 204/234, 235, 237, 238

[56] References Cited

U.S. PATENT DOCUMENTS

| | | | |
|---|---|---|---|
| 3,255,097 | 6/1966 | Williams | 204/238 |
| 3,658,470 | 4/1972 | Zievers et al. | 204/237 |
| 3,761,381 | 9/1973 | Yagishita | 204/238 |

Primary Examiner—T. M. Tufariello
Attorney, Agent, or Firm—Oblon, Fisher, Spivak, McClelland & Maier

[57] ABSTRACT

An electrolytic solution containing chromium (VI) compound is admixed with an aqueous solution of ferrous nitrate or ferrous chloride and pH of the mixture is adjusted to 8 to 8.5 with an aqueous solution of sodium hydroxide and the sludge containing chromium (III) compound is separated.

6 Claims, 1 Drawing Figure

U.S. Patent
Aug. 9, 1977
4,040,920
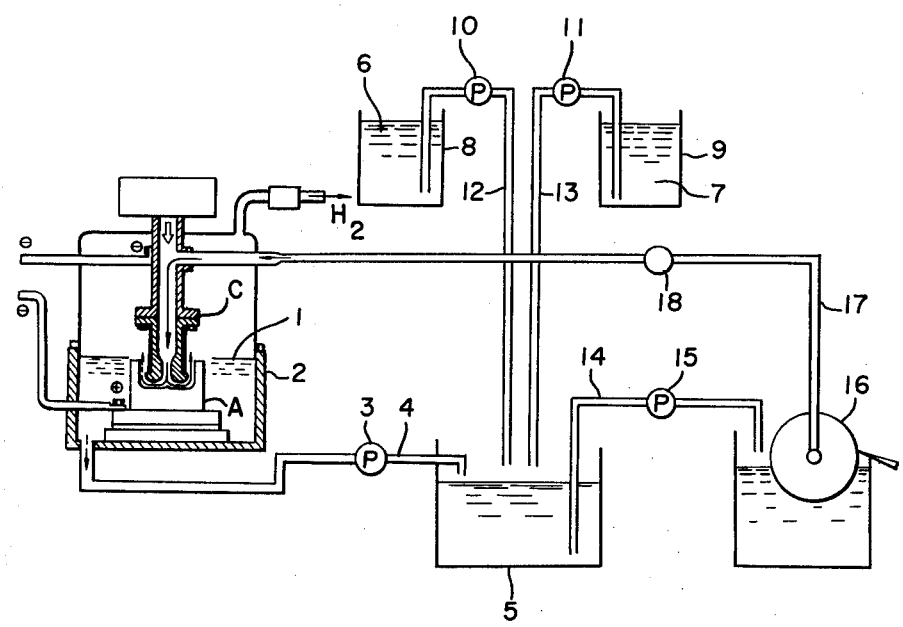

METHOD OF PREVENTING POLLUTION OF SLUDGE FORMED BY ELECTROLYTIC ETCHING WORK

BACKGROUND OF THE INVENTION

The present invention relates to a method of preventing the pollution of sludge formed by an electrolytic etching of a chromium containing metal. Electrolytic etching work have been applied for processing hardly shapeable steels such as chromium containing metals e.g. stainless steels, heat resisting alloy steels and the like.

In the electrolytic etching work, the dissolved chromium formed by an anodic electrolysis under high current density is acumulated in the electrolytic solution in the state of Cr (VI) such as chromate ions by an electrolytic oxidation.

The ferric oxide formed by the electrolytic etching work is separated from the electrolytic solution by means of a centrifugal separation or a filtration in vacuum.

Since, the electrolytic solution contains the chromium (VI) compound, the sludge also contains the chromium (VI) compound, which causes the pollution of environment.

The maximum regulated value of Cr(VI) is 1.5 mg of $Cr^{6+}$ per 1 liter of a sampling solution according to the leaching analysis. The sludge containing Cr(VI) of higher than said maximum regulated value should not be reclaimed under the regulation.

The sludge discharged from the conventional electrolytic etching usually contains about ten times of Cr(VI) to the maximum regulated value. Accordingly, the sludge causes the pollution of environments.

It has been proposed to remove chromate ions from an electrolytic solution in an electrolyic etching work by adding more than stoichiometric amount of ferrous sulfate to the electrolytic solution in acidic condition. (Japanese Unexamined Patent Publication No. 35061/1975).

It has been known to reduce chromate ions with ferrous ions as follows.

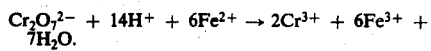
$$Cr_2O_7^{2-} + 14H^+ + 6Fe^{2+} \rightarrow 2Cr^{3+} + 6Fe^{3+} + 7H_2O.$$

Ferrous sulfate is acidic compound.

When an electrolytic solution having pH of 11 is admixed with stoichiometric amount of ferrous sulfate, pH of the electrolytic solution decreases to about 3.2, and the reduction of chromate ions to Cr(III) is caused in acidic condition.

The sludge formed by the known method also causes the pollution, because of high leaching of Cr(VI) compound from the sludge.

SUMMARY OF THE INVENTION

It is an object of the present invention to provide a method of preventing a pollution of sludge by converting chromium (VI) compound to chromium (III) compound in an eletrolytic solution in economical and effective manner.

The object of the present invention has been attained by adding ferrous nitrate or ferrous chloride to an electrolytic solution of sodium nitrate or sodium chloride at a rate of more than stoichiometric amount to chromium (VI) compound in the electrolytic solution, and adjusting pH of the mixture to 8 to 8.5 with an aqueous solution of sodium hydroxide, and separating the sludge in which chromium (III) compound is included.

BRIEF DESCRIPTION OF THE DRAWING

The FIGURE is a diagram of an electrolytic etching system according to the invention.

DETAILED DESCRIPTION OF THE EMBODIMENTS

The electrolytic solutions for electrolytic etching work including electrolytic polishing work can be aqueous solutions of sodium nitrate, sodium chloride or a mixture thereof.

The concentration of sodium nitrate or sodium nitrate is usually in a range of 3 wt. % to saturated concentration preferably 10 to 50 wt. % especially 10 to 30 wt. % such as about 20 wt. %.

It is possible to add desirable additives such as chlorates such as sodium chlorate, sodium perchlorate and organic acid such as citric acid, gluconic acid, etc.

The electrolytic solution is recycled through the electrolytic apparatus so as to wash out on the surface of the workpiece of the chromium containing metal as the anode.

The anode of the worked piece made of stainless steel or a heat resisting alloy steel, etc. is electrochemically dissolved by the electrolysis under high current density.

The workpiece is made of the chromium containing alloy. Accordingly, the chromium is oxidized by the anodic oxidation to form chromium (VI) compound which is accumulated in a form of chromium (VI) compounds, sodium chromate and sodium bichromate.

The chromium (VI) compound in the electrolytic solution should be converted to chromium (III) compound so as to be fixed in said state. It has been known to remove chromium (VI) compound from an aqueous solution by an ion-exchange method, a reduction neutralization method using a sulfite and the like.

However, in the case of the electrolytic solution in an electrolytic etching work, fine iron oxide is suspended. Accordingly, it is hard to apply the ion-exchange method.

In the reduction-neutralization method using sodium meta-bisulfite, sulfate ions contaminates the electrolytic solution and the sulfate ions adversely affects to the electrolytic etching work.

In the method of the invention, an aqueous solution of ferrous nitrate or ferrous chloride added to an electrolytic solution of sodium nitrate or to an electrolytic solution of sodium chloride.

The pH of the mixture is adjusted to 8 to 8.5 by adding an aqueous solution of sodium hydroxide, whereby ferrous hydroxide is formed together with sodium nitrate or sodium chloride as follows.

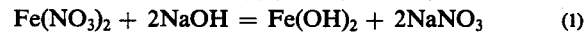
$$Fe(NO_3)_2 + 2NaOH = Fe(OH)_2 + 2NaNO_3 \qquad (1)$$

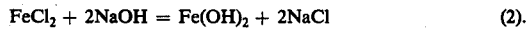
$$FeCl_2 + 2NaOH = Fe(OH)_2 + 2NaCl \qquad (2).$$

The resulting ferrous hydroxide has high chemical activity to reduce a chromium (VI) compound that is chromate ion or bichromate ion is reduced to $Cr^{3+}$.

The resulting $Cr^{3+}$ is hydrolyzed in the aqueous solution having pH 8 to 8.5 to form chromium hydroxide.

The chromium hydroxide is separated together with ferric hydroxide and fine iron oxide to form the sludge and the sludge is discharged as nonpollution sludge. The mother liquor contains sodium nitrate or sodium chloride and can be recycled as the electrolytic solution. The reaction is as follows.

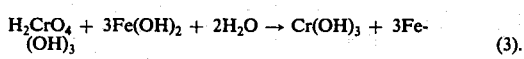

(3).

It is quite important fact that the reduction of the chromium (VI) compound is carried out by the reduction by ferrous hydroxide formed by hydrolysis of ferrous nitrate or ferrous chloride in the pH range of 8 to 8.5. It has been known that the chromium (VI) compound is reduced by ferrous ions such as ferrous sulfate in an acidic condition such as pH of lower than 3.

According to our studies, in the presence of oxidizing ions such as sodium nitrate, sodium chlorate, etc., it is hard to completely reduce a chromium (VI) compound in an acidic condition of pH of lower than 3, even though enough amount of ferrous ions are added.

When ferrous hydroxide is formed by adjusting pH to 8 to 8.5, the chromium (VI) compound can be completely reduced.

An amount of ferrous nitrate is usually more than stoichiometrical amount to the chromium (VI) compound in the electrolytic solution.

Excess of ferrous nitrate is neutralized with sodium hydroxide when pH is adjusted to 8 to 8.5, whereby ferrous hydroxide is formed.

The reaction of the ferrous nitrate can be carried out at 0° to 90° C preferably the room temperature to 60° C.

An aqueous solution of ferrous nitrate used for the reduction of the chromium (VI) compound can be easily produced by passing an aqueous solution of ferric nitrate through a column packed with iron pieces.

When iron is dissolved in nitric acid, ferrous nitrate is formed but it is oxidized in the presence of nitric acid. It is hard to obtain ferrous nitrate by reducing ferric nitrate with hydrogen or by electrolytically reducing it. However, when an aqueous solution of ferric nitrate is passed through a column packed with iron pieces, ferric nitrate is reduced to form ferrous nitrate. The iron pieces can be any waste iron such as lathe waste, iron wire, scrap iron, iron nail, steel shot, etc. The iron pieces are preferably packed in a column made of plastics, reinforced plastics, glass, refractory and the like.

The aqueous solution of ferric nitrate can be low concentration to saturated concentration. The reduction is carried out as follows.

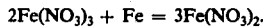

For example, 100 liter of an aqueous solution of ferric nitrate (400 g/l) was passed through a polyvinylchloride column having a diameter of 75 mm a length of 100 cm packed with steel shots having a diameter of 3 mm, at a space velocity of 3.

As the result, ferric nitrate was reduced to ferrous nitrate. The aqueous solution of ferrous nitrate was used in the method. It is also possible to produce an aqueous solution of ferrous nitrate by passing a dilute nitric acid (about 10%) through a column packed with iron pieces. The concentration of ferrous nitrate can be varied as desirable.

Referring to the FIGURE, one embodiment of the electrolytic etching system will be illustrated.

In the FIGURE, an anode (A) is a workpiece connected to a DC power source and is fixed on a zig which is electrically insulated from the base of the electrolytic etching apparatus. A cathode (C) is faced to the anode in an electrolytic solution (1) with a gap and is movable depending upon the electrolytic etching and the electrolytic solution is fed to the gap between the anoe (A) and the cathode (C), if desirable, through a passage formed in the cathode (C).

The electrolytic apparatus is usually shielded to discharge hydrogen from an upper outlet and to discharge the electrolytic solution from a bottom of the electrolytic solution vessel (2).

The electrolytic etching is usually carried out at 25° to 60° C under a flow rate of electrolytic solution of 6 to 60 m/sec.

The electrolytic solution (1) of sodium nitrate is recycled through a pump (3), a pipe (4) and a reaction vessel (5), a pipe (14), a pump (15), a vacuum filter (16), a pipe (17), a valve (18), and the passage in the cathode (C). An aqueous solution of ferrous nitrate (6) is fed from a tank (8) through a pump (10) and a conduit (12) to the reaction vessel (5) to reduce the chromium (VI) compound to the chromium (III) compound.

An aqueous solution of sodium hydroxide (7) is fed from a tank (9) through a pump (11) and a conduit (13) to the reaction vessel to adjust pH to 8 to 8.5.

In the reaction vessel (5), the electrolytic solution of sodium nitrate containing the chromium (VI) compound is admixed with the aqueous solution of ferrous nitrate and the mixture is adjusted to pH 8 to 8.5.

The resulting slurry is fed to the vacuum filter (16) to separate the sludge containing the chromium (II) compound which does not cause a pollution.

The feature and effects of invention will be further illustrated by certain examples.

EXAMPLE 1

In an electrolytic etching work for etching a stainless steel under recycling 20% of aqueous solution of sodium nitrate in an electrolytic etching apparatus having the maximum current of 2000 A and the voltage of 14V, the electrolytic solution contained 55 ppm of Cr (VI).

When the sludge was separated from the electrolytic solution, the sludge contained 15 mg of Cr(VI) per 1 liter of the sampling solution according to the elution analysis. This was about 10 times to the maximum regulated value.

In order to prevent the pollution of $Cr^{6+}$, a 100 liter reactor was connected to a recycling pipe before a centrifugal separator connected to the passage for recycling the electrolytic solution, and 20% of aqueous solution of ferrous nitrate was slowly added to the recycling electrolytic solution at a rate of 100 ml/min. and 10% of aqueous solution of sodium hydroxide was further added to the mixture to adjust pH to 8 to 8.5

The mixture was treated by a centrifugal separator to separate sludge and the mother liquor was recycled as the electrolytic solution.

According to the leaching analysis, no Cr(VI) was found.

The electrolytic etching work was not adversely affected by using the electrolytic solution treated for converting Cr(VI) to the chromium (III) compound.

EXAMPLE 2

In an electrolytic etching work for etching a heat resisting alloy steel under recycling 20% of aqueous solution of sodium chloride in the electrolytic etching apparatus, the electrolytic solution contained 18 ppm of $Cr^{6+}$. When the sludge was separated from the electrolytic solution, the sludge contain 6 mg of Cr(VI) per 1 liter of the sampling solution according to the leaching analysis.

This was about 4 times to the maximum regulated value.

In order to prevent the pollution of Cr(VI), in accordance with the process of Example 1, 20% of aqueous solution of ferrous chloride was slowly added to the recycling electrolytic solution at a rate of 20 ml/min., and 10% of aqueous solution of sodium hydroxide was further added to adjust pH to 8 to 8.5.

The mixture was filtered in vacuum to separate sludge and the mother liquor was recycled as the electrolytic solution.

According to the leaching analysis, no Cr(VI) was found.

The electrolytic etching work was not adversely affected by using the electrolytic solution treated for converting Cr(VI) to chromium (III) compound.

As it is clear from the examples, the sludges discharged from the electrolytic etching work do not cause the pollution of $Cr^{6+}$.

We claim:

1. A method of preventing pollution of a sludge formed by an electrolytic etching work which comprises admixing an aqueous solution of ferrous nitrate or ferrous chloride to an electrolytic solution which is recycled, at a ratio of more than stoichiometric amount of ferrous nitrate or ferrous chloride to chromium (VI) compound and adjusting pH of the mixture to 8 to 8.5 by adding an aqueous solution of sodium hydroxide, and separating a sludge formed by the neutralization.

2. The method according to claim 1, wherein the electrolytic solution which is used for electrolytic etching work is moved to a tank wherein the aqueous solution of ferrous nitrate or ferrous chloride is admixed and pH is adjusted with the aqueous solution of sodium hydroxide, and the resulting slurry is passed through a centrifugal separator or a vacuum filter to separate the sludge and the filtrate is recycled.

3. The method according to claim 1, wherein the aqueous solution of ferrous nitrate or ferrous chloride is continuously fed to the electrolytic solution in a passage for recycling it and the aqueous solution of sodium hydroxide is continuously fed to the mixture in the down-flow before a sludge separator of a centrifugal separator.

4. The method according to claim 1, wherein ferrous nitrate is used for the electrolytic solution of sodium nitrate.

5. The method according to claim 1, wherein ferrous chloride is used for the electrolytic solution of sodium chloride.

6. The method according to claim 1, wherein the aqueous solution of ferrous nitrate is prepared by passing an aqueous solution of ferric nitrate through iron pieces.

* * * * *